United States Patent
Lange (10) Patent No.: US 10,777,013 B1
(45) Date of Patent: Sep. 15, 2020

(54) SYSTEM AND METHOD FOR ENHANCING APPROACH LIGHT DISPLAY

(71) Applicant: Rockwell Collins, Inc., Cedar Rapids, IA (US)

(72) Inventor: Nixon Lange, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/231,190

(22) Filed: Dec. 21, 2018

(51) Int. Cl.
| G06T 19/00 | (2011.01) |
| G01C 23/00 | (2006.01) |
| B64D 45/00 | (2006.01) |
| G02B 27/01 | (2006.01) |

(52) U.S. Cl.
CPC ............ G06T 19/006 (2013.01); B64D 45/00 (2013.01); G01C 23/005 (2013.01); G02B 27/0101 (2013.01); G02B 2027/014 (2013.01); G02B 2027/0138 (2013.01); G02B 2027/0141 (2013.01)

(58) Field of Classification Search
None
See application file for complete search history.

(56) References Cited

U.S. PATENT DOCUMENTS

| 7,617,022 | B1 * | 11/2009 | Wood | G02B 27/01 340/447 |
| 7,679,528 | B1 * | 3/2010 | Etherington | G01S 1/70 340/945 |
| 8,487,787 | B2 * | 7/2013 | Best | G02B 27/0093 340/933 |
| 8,666,570 | B1 * | 3/2014 | Tillotson | G06T 7/0008 340/945 |
| 9,058,510 | B1 * | 6/2015 | Bold | G06T 11/00 |
| 9,341,846 | B2 * | 5/2016 | Popovich | G02B 27/0176 |
| 9,558,674 | B2 * | 1/2017 | He | G08G 5/0021 |
| 2008/0208468 | A1 * | 8/2008 | Martin | G01C 21/30 701/469 |
| 2011/0282580 | A1 * | 11/2011 | Mohan | G01C 21/005 701/472 |
| 2012/0081236 | A1 * | 4/2012 | Best | G02B 27/0093 340/945 |
| 2013/0155093 | A1 * | 6/2013 | He | G01C 23/005 345/592 |
| 2013/0188049 | A1 * | 7/2013 | Koukol | G08G 5/0021 348/144 |
| 2014/0214245 | A1 * | 7/2014 | Baudson | B65D 45/00 701/14 |
| 2016/0035080 | A1 * | 2/2016 | O'Dell | H04N 5/23232 382/103 |
| 2016/0300497 | A1 * | 10/2016 | He | G08G 5/0021 |
| 2017/0030735 | A1 * | 2/2017 | Mohideen | G08G 5/0021 |
| 2018/0300856 | A1 * | 10/2018 | Payot | G06T 5/50 |

OTHER PUBLICATIONS

Burgess, Malcolm A. "Synthetic vision for low-visibility aircraft operations: what we know and what we do not know." Sensing, Imaging, and Vision for Control and Guidance of Aerospace Vehicles. vol. 2220. International Society for Optics and Photonics, 1994.*

\* cited by examiner

Primary Examiner — Ryan M Gray
(74) Attorney, Agent, or Firm — Suiter Swantz pc llo (57) ABSTRACT

An image processing system for enhanced vision includes a processor and memory coupled to the processor. The memory contains program instructions that, when executed, causes the processor to provide symbols for a HUD image. The symbols represent runway lights captured by the enhanced vision system.

20 Claims, 5 Drawing Sheets

SYSTEM AND METHOD FOR ENHANCING APPROACH LIGHT DISPLAY

BACKGROUND

The present disclosure relates to vision systems and display of information detected by the vision system.

An aircraft uses a vision system, such as, an enhanced vision system (EVS), to provide imagery to an aircraft crew. The imagery can include an airport terminal area and runway environment when meteorological or lighting conditions prevent a clear natural view of the external surroundings of the aircraft through the windscreen. For example, the EVS may overlay an image of an airport terminal area and runway environment over the pilot's natural unaided view of the external surroundings of the aircraft through the aircraft's cockpit windscreen via a head up display (HUD). Such imagery can improve the situational awareness of the flight crew during instrument approach procedures in low visibility conditions such as fog. The EVS image is often provided to a head up display as a conformal image with the external surroundings.

An EVS often uses a passive sensing system to acquire data used to generate imagery of the airport terminal area and runway environment. A passive sensor, such as, a forward looking infrared (FLIR) camera or visible light spectrum camera, receives electromagnetic energy from the environment and outputs data that may be used by the system to generate video images from the point of view of the camera. The camera is installed in an appropriate position, such as in the nose of an aircraft, so that the pilot can be presented with an appropriately scaled and positioned video image on the HUD having nearly the same point of view as the pilot when viewing the external surroundings of the aircraft through the combiner of the HUD.

Night vision flight rules (NVFR) approaches generally do not use EVS because such systems are often optimized for low visibility operations and have performance limitations during clear NVFR approaches (e.g., black hole approaches).

Thus, there is a need for a system for and method for assisting clear NVFR approaches. Further, there is a need for systems for and methods of providing low cost runway light approach sensing. There is also a need for display systems for and methods of providing EVS sensed information on a head up display (HUD) during night approaches. It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, embodiments of the inventive concepts disclosed herein are directed to an image processing system for enhanced vision including a processor and memory coupled to the processor. The memory contains program instructions that, when executed, causes the processor to provide symbols for a HUD image. The symbols represent runway lights captured by the enhanced vision system.

In some embodiments, the position of the lights is cross referenced with approach light systems geometry to determine a runway threshold and provide a synthetic runway depiction.

In a further aspect, embodiments of the inventive concepts disclosed herein are directed a head up display system. The head up display system includes a sensor configured to provide image data associated with an image of an environment and a head up display computer. The head up display computer is configured to provide a HUD image including runway light symbols and flight vector symbols. The image data is processed to provide difference data that represents positions of blinking lights in the environment and is provided using the image data with blinking lights on and the image data with blinking lights off in the environment. The difference data is used to provide the runway light symbols conformally with a view of the environment using the head up display system.

In a further aspect, embodiments of the inventive concepts disclosed herein are directed to a method. The method includes receiving a first image captured by an enhanced vision system and determining if runway lights are present in the first image. The method also includes providing data representing the location of the lights in the image and providing a HUD image on combiner comprising symbols indicative of the runway lights if the runway lights are present in the first image.

In a further aspect, embodiments of the inventive concepts disclosed herein are directed to an apparatus for enhancing a head up display image on a head up display. The apparatus includes a camera and a processor. The camera is configured to provide image data associated with an image of an environment. The image data is conformal with a view using the head up display. The processor is configured to process the image data from the camera and provide difference data. The processor is also configured to provide the difference data using the image data with blinking lights on in the environment and the image data with blinking lights on in the environment. The processor is further configured to provide the difference data for merger with the head up display image.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Before describing in detail the inventive concepts disclosed herein, it should be observed that the inventive concepts disclosed herein include, but are not limited to, a novel structural combination of components, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to various exemplary embodiments, a display system uses information from an EVS or enhanced flight vision system (EFVS) to provide an enhanced image to a pilot or co-pilot on an aircraft display, such as an head down display (HDD) or HUD. In some embodiments, the enhanced image includes approach light enhancement and is provided conformally on HUD for NVFR and/or low visibility approaches. In some embodiments, a camera of the EVS is turned on during a night VFR approach or low visibility instrument flight rules (IFR) approach and is configured to provide useful information that can be displayed conformally on the HUD. In some embodiments, the EVS provides images to enhance the depiction of runway approach lights on the HUD (e.g., runway lights that that blink periodically). The enhanced image allows a pilot to see features of the runway on a HUD without providing the EVS video image to the HUD in some embodiments.

Systems and methods define a region around the Flight Path Vector (FPV) or Flight Path Angle Reference Cue (FPARC) as the zone to look for blinking or flashing lights during an approach in some embodiments. The HUD computer can provide flashing symbols corresponding to the flashing lights or non-flashing symbols corresponding to the lights. The flashing symbols can be provided conformally with a runway symbol on the combiner in some embodiments. In some embodiments, symbols corresponding to runway location, runway environment or runway threshold (e.g., including the lighting system) are provided based upon the location of the lights for situational awareness.

Figure 1:
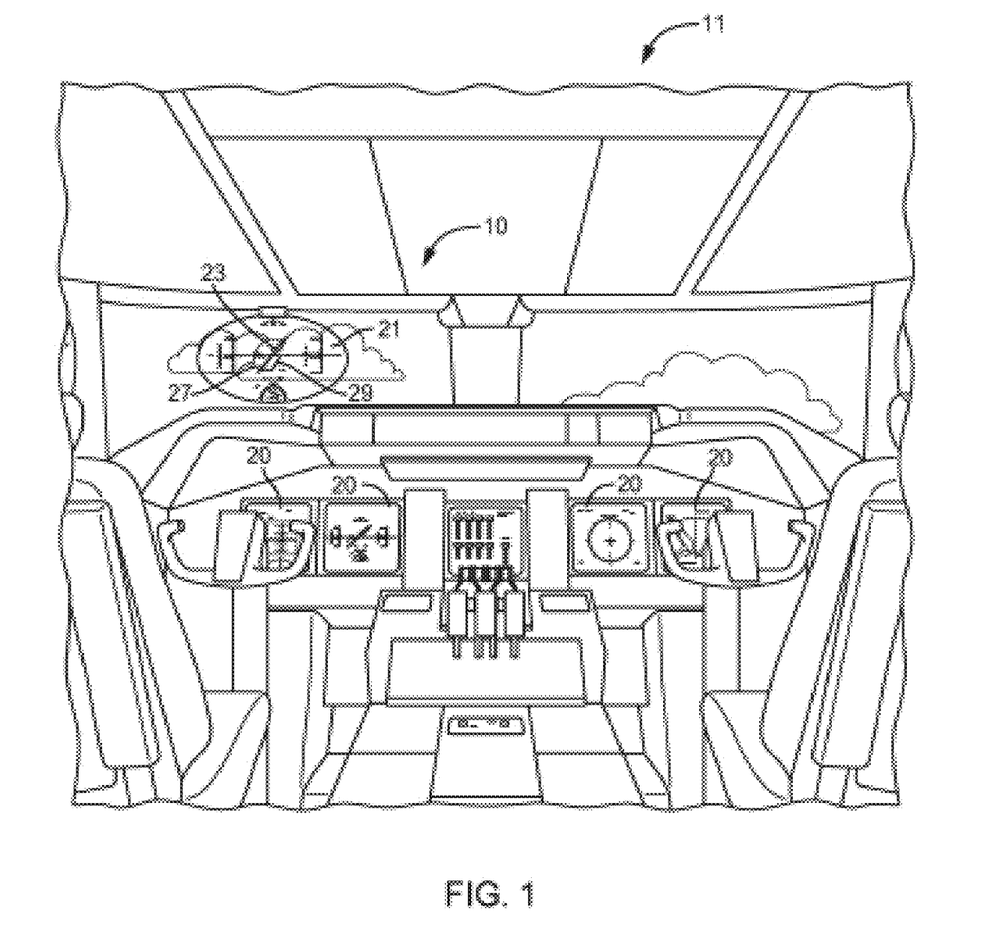
FIG. 1 is a schematic illustration of an aircraft control center including an exemplary embodiment of head up display system in accordance with the inventive concepts disclosed herein.
Figure 2:
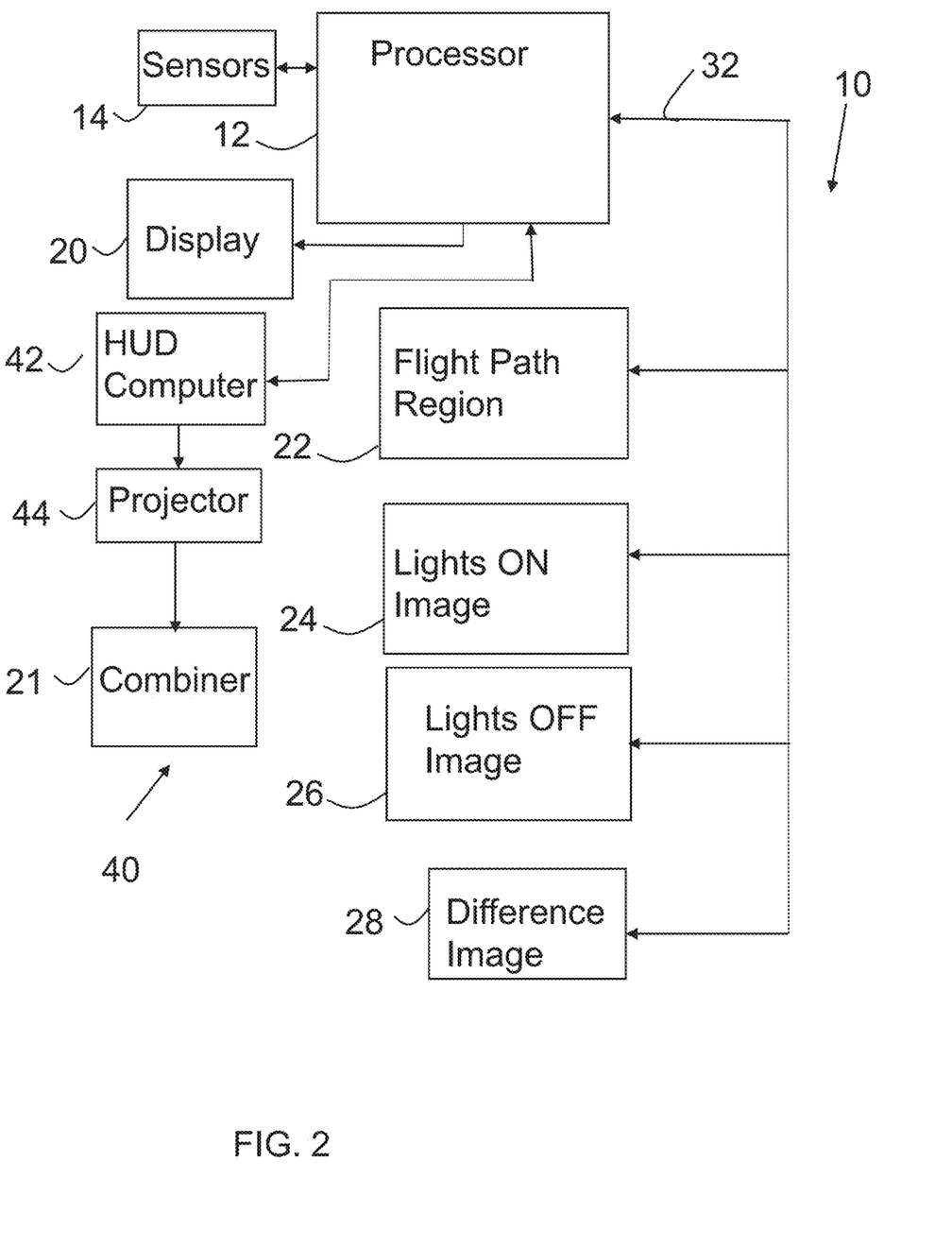
FIG. 2 a schematic block diagram of a display system for enhancing an image provided on the head up display system illustrated in FIG. 1 in accordance with the inventive concepts disclosed herein.

Referring to FIG. 1, in an aircraft 11 having an aircraft control center or cockpit includes a display system 10. The aircraft control center includes flight displays 20 embodied as head down displays (HDDs). The aircraft control center also includes a combiner 21 associated with a head up display (HUD) system 40 (FIG. 2). In some embodiments, the combiner 21 is provided as part of a wearable HUD. Conformal images including HUD symbols and symbols derived from EVS information are provided on combiner 21 in some embodiments.

Figure 3:
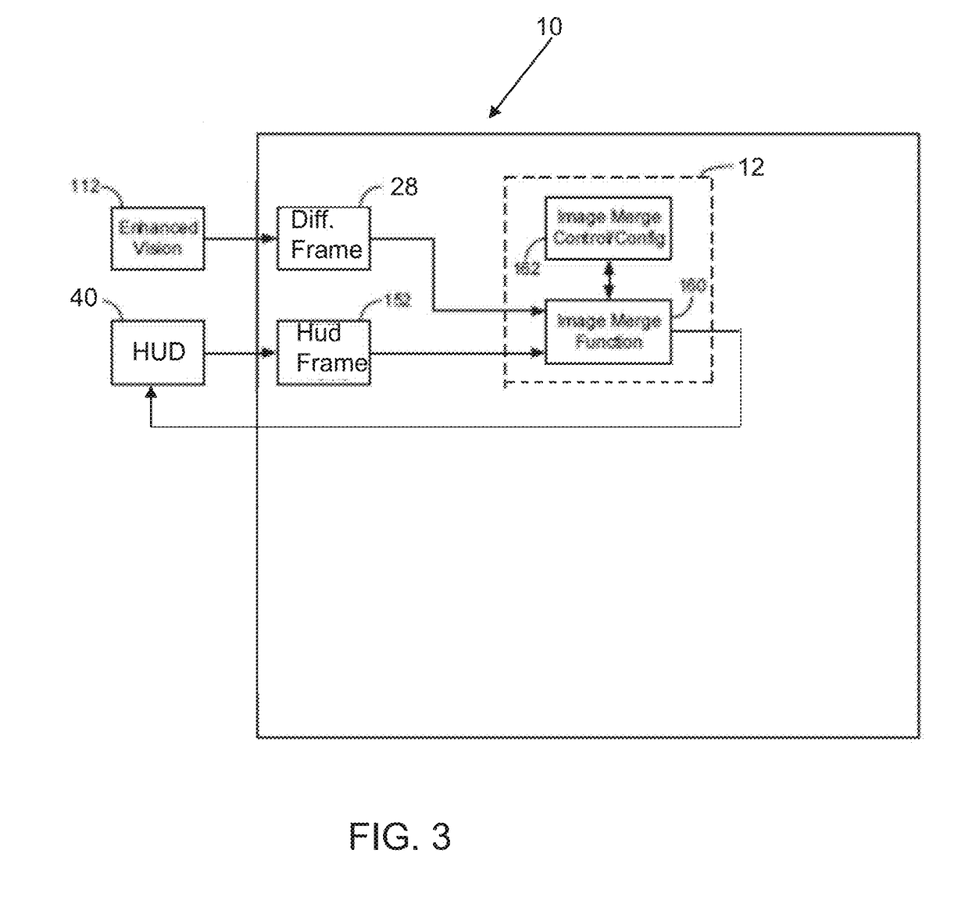
FIG. 3 is a schematic block diagram of the display system illustrated in FIG. 2 in communication with an enhanced vision system and a HUD system in accordance with the inventive concepts disclosed herein.

The flight displays 20 can be used to provide information to the flight crew, thereby increasing visual range and enhancing decision-making abilities. In some embodiments, flight displays 20 and combiner 21 can include a weather display, a joint display, a weather radar map and a terrain display. Further, the flight displays 20 may include images from a synthetic vision system (SVS) or an EVS 112 (FIG. 3). For example, the flight displays 20 and combiner 21 can include a display configured to display a three-dimensional perspective image of terrain and/or weather information. Other views of terrain and/or weather information may also be provided (e.g., plan view, horizontal view, vertical view, or combinations thereof). Additionally, the flight displays 20 and combiner 21 can be implemented using any of a variety of display technologies, including CRT, LCD, organic LED, dot matrix display, holographic combiner, waveguide display, and others.

The image on the combiner 21 includes a runway symbol 23 and/or features 29 associated with runway. In some embodiments, at least one of displays 20 or combiner 21 displays a merged image including symbols derived from EVS data and HUD symbols. An extended runway center line 27 is provided on displays 20 or combiner 21 in some embodiments.

The display system 10 causes the combiner 21 to display light symbols derived from EVS data ins some embodiments. Advantageously, identification of the orientation of runway and runway lights (e.g., flashing lights, such as, approach lights and runway end lights) allows the runway and its orientation to be viewed by one or pilots in night conditions in some embodiments. The runway lights can be end of runway lights, center line lights, beacon lights, approach lights, etc. The display system 10 can use the position of flashing lights to emphasize the lights on the HUD system 40 (FIG. 2), thereby aiding in approach operations. In some embodiments, the display system 10 limits the enhancement to only lights that flash which allows the combiner 21 to provide bright, easily distinguishable symbols instead of relying on the EVS to render the runway threshold with enough contrast against its surroundings. The symbols for the lights can be provided after position verification and identification verification. For example, the type of light can be verified by its color and flashing rate. Further, lights such as rabbit lights or runway center lights can be identified based upon the flashing relationship with respect to neighboring lights, or flashing phase, or geometry with respect to an ALS database.

Referring to FIG. 2, the display system 10 includes a processor 12, a flight path region module 22, an image frame memory 24, an image frame memory 26, and an image frame memory 28. The display system 10 is in communication with sensors 14, a flight display 20 and a HUD system 40.

The HUD system 40 includes a HUD computer 42, a projector 44, and the combiner 21. The HUD computer 42 receives data related to the position and orientation of the aircraft 11 from aircraft sensors (e.g., sensors 14) and aviation equipment. The HUD computer 42 determines the appropriate position for conformal HUD symbols on the combiner 21 and provides HUD image data to the projector 44 for projection of the HUD image on the combiner 21 and provides the HUD image via the projector 44 to the combiner 21. The image is provided conformally with the outside environment on the combiner 21. The projector 44 is any suitable device for proving conformal images to the combiner, including but not limited to a collimating CRT or LCD based projector. The combiner 21 is a holographic, combiner, a waveguide combiner, a parabolic combiner, a head worn combiner, or any suitable device for providing conformal images over an environment.

In some embodiments, the HUD image includes at least on symbol for representing the placement of a light (e.g., a flashing light) in the environment. The HUD image can use a circular symbol, an X symbol, a cross symbol, a dash, text or other symbol to emphasize the light (e.g., a flashing Runway End Identification Lights (REIL)). The symbols for the lights can vary as needed, and the periodic flashing built into any approach lighting system can be emphasized on the combiner using the display system 10 in some embodiments.

The sensors 14 include any avionic sensor and include a camera or EVS 112 (FIG. 3). The sensors 14 include position sensors, flight management computers, GPS receivers, inertial reference system (IRS), altimeters, attitude sensors or other avionic devices. The sensors 14 provide conformal image data and aircraft position data to the HUD computer 42 and/or the processor 12.

The camera which can be part of the EVS 1112 (FIG. 3) provides image data of an outside environment to one or more of the memories 24, 26, and 28. The camera is passive infrared, visible light or combination thereof light sensor in some embodiments. In some embodiments, the camera is a shortwave infrared, longwave infrared, and visible (e.g., color) camera that is configured to capture images at different wavelengths and merges the images into a composite video image. In some embodiments, the camera is a runway gear camera or a security camera attached to the aircraft 11. The camera is installed in an appropriate position, such as in the nose of the aircraft 11, so that the pilot can be presented with an appropriately scaled and positioned video image on the combiner 21 having nearly or exactly the same point of view as the pilot when viewing the external surroundings of the aircraft 11 through the combiner 21 in some embodiments.

The processor 12 is a computing device that is configurable by software. In some embodiments, the processor 12 is part of EVS 112 and/or the HUD computer 42 or is a standalone device. The display system 10 can also be integrated with the HUD computer 42, the EVS 112, a flight computer, an SVS, or other avionic equipment.

The processor 12 utilizes the flight path region module 22 to identify a region associate with the zone near the aircraft 11. In some embodiments, the flight path region module 22 is part of the HUD computer. The processor 12 processes the image data in the zone for identification of lights (e.g., flashing runway edge lights) and their respective positions via a bus 32. The processor 12 (or the EVS 112) identifies lights that flash at a periodic rate within that zone are detected by the EVS sensor, and the X/Y positions of the flashing lights are relayed from the processor 32 to the HUD computer 42.

The processor 12 or EVS 112 identifies a light on image in the zone and stores the image in the memory 24 and identifies a light off image in the zone and stores the image in the memory 26. The lights on image (e.g., during the approach light's blinking) is subtracted from the lights off image to obtain a difference image (or vice versa). The difference images provide image data with concentrations of bright pixels around each light source. The pixel intensities are averaged to find the horizontal and vertical centers of the approach lights in some embodiments. These X/Y values are conformal, as the EVS 112 or camera image is designed to be aligned and displayed conformal on the combiner 221 of the HUD system 40 in some embodiments.

The zone surrounds the flight symbol of the HUD image in some embodiments. The zone is around the Flight Path Vector (FPV) or Flight Path Angle Reference Cue (FPARC) in some embodiments. During an approach, the FPV or FPAC, which is the instantaneous direction of the aircraft 11 at any given time, is generally lined up with the runway threshold and the area around it is advantageously a suitable area to process for the presence of runway lights or airport beacon lights.

The zone can be any size. The zone is associated with a region around a horizontal bore sight, a horizon line, a flight path vector or flight path angle reference cue of the HUD image in some embodiments. The zone is less than 10 percent (e.g., less than 5 percent) of the HUD image in some embodiments. The zone can be circular, oval, rectangular, square or other shapes. In some embodiments, the processor 12 only uses the zone to search for flashing lights during an approach phase of flight and is automatically engaged in response to the aircraft 11 entering the approach phase of flight. In some embodiments, the zone is sized according to the approach path. In some embodiments, the zone is larger the further the aircraft 11 is away from the runway or at higher altitudes and is reduced in sized as the aircraft 11 is closer to the runway or to the ground. In some embodiments, the zone masks off or does not include regions associated with neighboring runways to reduce distractions.

Referring to FIG. 3, the display system 10 can be utilized for providing an image to any of displays 20 or combiner 21. Display system 10 is in communication with an enhanced vision system (EVS) 112 and the HUD system 40. Display system 10 includes the processor 12, the memory 28 for storing the difference frame from the EVS 112, a memory 152 for storing a HUD frame from SVS 111, an image merge function module 160, and an image merge control/configuration module 162.

The flight path region module 22, the image merge module 160, and the image merge control/configuration module 38 can be embodied as software modules operating on a computing platform or processor 12 and can be stored on a non-transitory medium. The processor 12 generates a merged HUD image frame from the difference image data stored in the memory 28 and the HUD image data stored in the memory 152.

In some embodiments, display system 10 combines or fuses images from HUD system 40 and the difference image derived from image data from the EVS 112 to provide an overall image provided to the pilot with runway light symbols. The processor 112 can also receive aircraft position data from an aircraft data source. The aircraft data source can include any system or sensor (or combination thereof) that provides navigation data or aircraft flight parameters. For example, the navigation system in the aircraft 11 has numerous sub-systems. Sub-systems which provide aircraft position data and flight parameter data could include, but are not limited to, an inertial navigation system (INS), a global navigation satellite system (e.g., global positioning system (GPS)), air data sensors, compasses, and a flight management computer (FMC).

The image merge function module 126 receives difference image from memory 26 and the HUD image data from the memory 152 and merges the data to appropriately display the EVS derived light symbols. The difference data is transformed into symbol data before merging in some embodiments. The symbols are periodically blinked or flashed according to the timing of the blinking lights in some embodiments. Time stamps associated with the images from the EVS 112 can be used to determine the timing for the blinking or flashing signals in some embodiments.

The processor 12 executes a fusion processing algorithm for fusing the frames from the memory 22 and the memory 152 provided as video signals in some embodiments. This fusion process may include special formatting (positioning, sizing, cropping, etc.) of specific features or the entire image from a specific image source based on other sensor inputs of the aircraft 11. After the combined or fused image has been completed, the entire image is sized to fit appropriately within the total HUD field-of-view and conformally overlay the outside scene, which is viewed through combiner 21 of the HUD. In addition, the overall fused image contrast is standardized with the brightness/contrast to support the brightness/contrast controls of the HUD.

Real time images derived from the EVS 112 allow the pilot exact and very reliable confirmation of the presence of runway lights in some embodiment. In some embodiments, localization of the pattern of runway lights allows easy recognition in the longitudinal location of the aircraft 11 with respect to the runway. Accurate longitudinal location is particularly advantageous for pilots because judging longitudinal location from perspective imagery such as imagery from focal-plane based enhanced flight vision systems or C-scope transform can be difficult. Runway center line lights flashing according to a rabbit operation can be identified by their orientation with respect to each other, flashing rate, and flashing order. Runway end lights can be identified by their flashing rate which is different than runway center line lights. Beacon lights can be identified by their color. For example, a military beacon lights have two white flashes followed by a green flash. Other beacon light colors represent civilian airports or sea ports. The captured color can be determined by pixel RGB value.

In some embodiments, the runway data in a terrain database can be compared to the image derived from image data (light locations) from the EVS 112 to confirm accuracy. Various matching algorithms can be utilized to determine if the location provided by the EVS 112 is accurate with respect to the known location of runway lights. If the compare function indicates that there is not a match, an error is indicated. The indication can be provided on combiner 21 or on displays 20.

The image control configuration module 138 can provide format adjustments to data. The EVS 112 and the HUD system 40 can have their own specific interface type and format. Also, each display of displays 20 and combiner 21 may require specific formatting. A standard format can be a format used in HUD processing functions.

Figure 4:
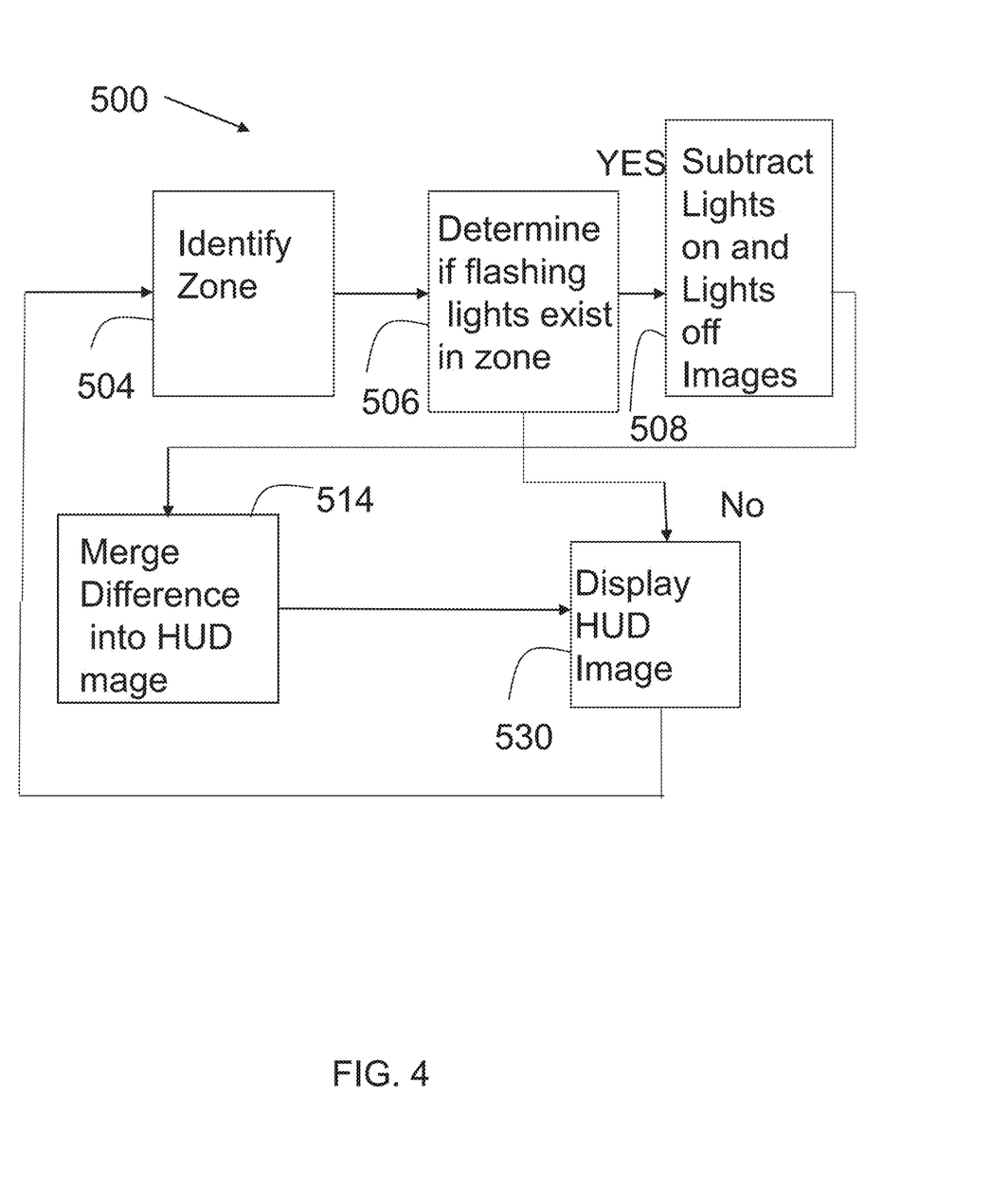
FIG. 4 is a flow diagram of a process executed in the display system for enhancing an image provided on the head up display system illustrated in FIG. in accordance with the inventive concepts disclosed herein.

With reference to FIG. 4, a flow 500 can be performed by the display system 10 in some embodiments. The flow 500 can be performed when the aircraft 11 is on approach in some embodiments. At an operation 504, the display system 10 identifies a zone for reviewing SVS images for runway lights such as blinking or flashing runway end lights.

At an operation 506, the display system 10 determines whether flashing lights are present in the zone. The presence of flashing lights can be determined by comparing a series of images over time and determining whether pixel brightness at the same locations changes abruptly over time. The location of the lights is determined using the pixel locations in the image adjusted for movement over time. The pixel locations correspond to a real world location based upon the positioning of the sensor of the EVS 112 and HUD system 40 and the orientation and position of aircraft 11 in some embodiments. If lights are detected, the display system 10 advances to an operation 508. If flashing lights are not detected in the zone, the display system advances to an operation 530. At the operation 508, the lights on image is subtracted from the lights out image or vice versa to provide a difference image data.

At an operation 514, the HUD image data is merged with difference image data to provide symbols of the runway lights for the HUD image. At the operation 530, the HUD image is displayed on the combiner (FIG. 1). After operation 530, the flow 500 returns the operation 504.

Figure 5:
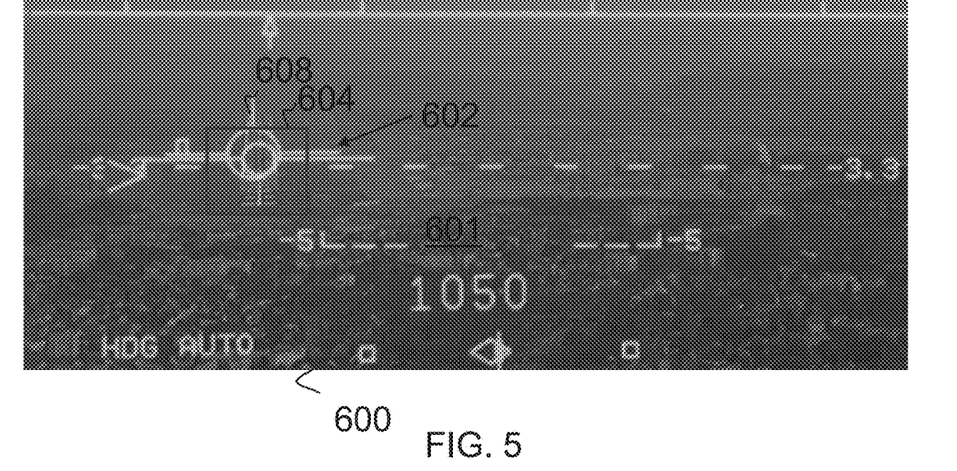
FIG. 5 is a schematic drawing of a HUD image without symbols from the display system for enhancing an image provided on the head up display system illustrated in FIG. 2 in accordance with the inventive concepts disclosed herein.

Referring to FIG. 5, a HUD image 600 is provided on the combiner 21 (FIG. 1) and does not include runway light indicators. The HUD image 600 is provided conformally with the outside environment 601 and includes flight path vector symbology 602 and a runway symbol 608. A rectangle 604 represents the zone for checking for runway lights and is not actually displayed on the combiner 21 in some embodiments. Other symbology including textual and flight instrument symbols can be provided in the image 600.

Figure 6:
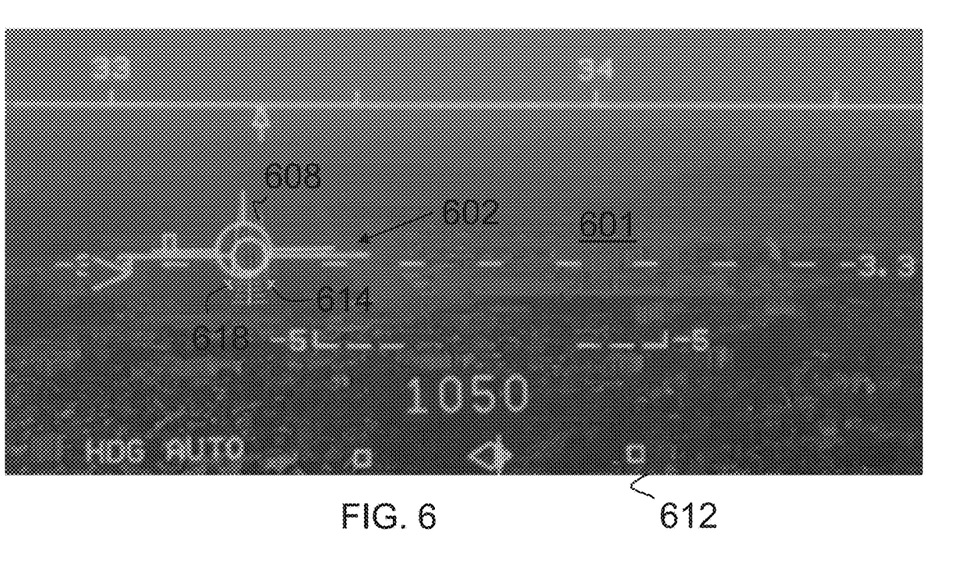
FIG. 6 is a schematic drawing of a HUD image with symbols from the display system for enhancing an image provided on the head up display system illustrated in FIG. 2 according to an exemplary embodiment.

Referring to FIG. 6, a HUD image 612 is provided on the combiner 21 and does include runway light indicators or symbols 614 and 618. The HUD image 612 is similar to the HUD image 600 and is provided conformally with the outside environment 601 and includes the flight path vector symbology 602 and the runway symbol 608. Other symbology including textual and flight instrument symbols can be provided in the image 612. The symbols 612 and 618 can flash or blink in synchronism with the flashing of real world runway lights.

In some embodiments, the display system 10 is used with an instrument landing system (ILS). Information from the ILS is used to provide a depiction of the runway on the combiner 21 or the displays 20. The captured end of runway light position captured by the EVS 112 is used to augment the depiction of the runway (e.g., assists in the drawing of lines representing the end of the runway).

In some embodiments, the display system 10 is used during cruise mode to spot airport locations. A camera such as a landing gear camera can be used in cruise mode to locate airport beacons. The airport locations can be derived from the beacon location and provide information to the flight management computer in case an emergency or urgent landing is necessary.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

As noted above, embodiments within the scope of the inventive concepts disclosed herein include program products comprising non-transitory machine-readable media for carrying or having machine-executable instructions or data structures stored thereon. Such machine-readable media may be any available media that may be accessed by a computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a computer or other machine with a processor. Thus, any such a connection is properly termed a machine-readable medium. Combinations of the above are also included within the scope of machine-readable media. Machine-executable instructions comprise, for example, instructions and data which cause processor to perform a certain function or group of functions.

Embodiments in the inventive concepts disclosed herein have been described in the general context of method steps which may be implemented in one embodiment by a program product including machine-executable instructions, such as program code, for example in the form of program components executed by machines in networked environments. Generally, program components include routines, programs, objects, components, data structures, etc. that perform particular tasks or implement particular abstract data types. Machine-executable instructions, associated data structures, and program components represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

What is claimed is:

1. An apparatus for enhancing a head up display image on a head up display, the apparatus comprising:
a camera configured to provide image data associated with an image of an environment, the image data being conformal with a view using the head up display, wherein the image data comprise at least a first image and a second image; and
a processor configured to:
process the image data from the camera;
receive the first image captured by the camera;
determine if runway lights are present in the first image, provide data representing location of the runway lights in the first image;
provide a HUD image on a combiner comprising symbols indicative of the runway lights if the runway environment lights are present in the first image;
receive the second image captured by the camera, the second image being when the runway environment lights are off;
determine a delta between the second image and the first image captured when the runway lights are on; and
use the delta between the second image and the first image to generate the symbols indicative of the runway lights.

2. The apparatus of claim 1, wherein the processor is configured to process the image data for an area around a flight path vector or flight path angle reference cue of the head up display image, the area being smaller than a total image captured by the camera.

3. The apparatus of claim 2, wherein the area is less than one fifth of a size of the total image.

4. The apparatus of claim 1, wherein the flashing lights are runway lights.

5. The apparatus of claim 4, wherein the runway lights are approach lights.

6. The apparatus of claim 4, wherein the runway lights are runway end lights.

7. The apparatus of claim 1, wherein the head up display image includes symbols representing the flashing lights.

8. The apparatus of claim 7, wherein the symbols are flashed to represent the flashing lights.

9. The apparatus of claim 1, wherein the processor is configured to process the image data for an area interest in the head up display image, the area being smaller than a total image captured by the camera.

10. A method, comprising:
receiving a first image captured by an enhanced vision system;
determining if runway lights are present in the first image;
providing data representing location of the runway lights in the first image;
providing a HUD image on a combiner comprising symbols indicative of the runway lights if the runway lights are present in the first image;
receiving a second image captured by the enhanced vision system, the second image being when the runway lights are off; and
subtracting the second image from the first image captured when the runway lights are on; and using a difference from the subtracting to provide the symbols.

11. The method of claim 10, wherein the enhanced vision system comprises a visual light or infrared camera.

12. The method of claim 10, wherein the first image is conformal with the HUD image.

13. The method of claim 10, wherein the first image is associated with a region around a horizontal bore sight, a horizon line, a flight path vector or flight path angle reference cue of the HUD image, the region being smaller than a total image captured by the enhanced vision system.

14. The method of claim 10, wherein the first image and the second image are associated with a region around a flight path vector or flight path angle reference cue of the HUD image, the region being smaller than a total image captured by the enhanced vision system.

15. A head up display system, comprising:
a sensor configured to provide image data associated with an image of an environment; and
a head up display computer configured to provide a HUD image comprising runway light symbols and flight vector symbols, wherein the HUD image is derived from image data, the image data comprising at least a first image and a second image, the HUD computer being further configured to:
receive the first image captured by the sensor;
determine if runway lights are present in the first image;
provide data representing location of the runway lights in the first image;
provide a HUD image on a combiner comprising symbols indicative of the runway lights if the runway lights are present in the first image;
receive the second image captured by the sensor, the second image being when the runway lights are off; and
process the image data to determine a delta between the second image and the first image captured when the runway lights are on; the delta representing positions of blinking lights in the environment and being provided using the image data with flashing lights on and the image data with flashing lights off in the environment, the delta being used to provide the runway light symbols conformally with a view of the environment using the head up display system.

16. The head up display system of claim 15, wherein the image data is associated with a region around a flight path vector or flight path angle reference cue of the HUD image, the region being smaller than a total image captured by the sensor.

17. The head up display system of claim 15, wherein a first image and a second image for providing the image data are associated with a region around a flight path vector or flight path angle reference cue of the HUD image, the region being smaller than a total image captured by the sensor.

18. The head up display system of claim 15, wherein the runway light symbols are flashed.

19. The head up display system of claim 15, wherein the runway light symbols are provided proximate a runway symbol.

20. The head up display of claim 15, wherein the first image is associated with a region around a horizontal bore sight, a horizon line, a flight path vector or flight path angle reference cue of the HUD image, the region being smaller than a total image captured by the enhanced vision system.

* * * * *